(12) United States Patent
Kim

(10) Patent No.: US 12,196,279 B2
(45) Date of Patent: Jan. 14, 2025

(54) BRAKE APPARATUS FOR VEHICLE

(71) Applicant: HYUNDAI MOBIS Co., Ltd., Seoul (KR)

(72) Inventor: Hyeong Sik Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 484 days.

(21) Appl. No.: 17/570,587

(22) Filed: Jan. 7, 2022

(65) Prior Publication Data

US 2023/0097648 A1    Mar. 30, 2023

(30) Foreign Application Priority Data

Sep. 27, 2021   (KR) ........................ 10-2021-0127444

(51) Int. Cl.
| | | |
|---|---|---|
| *F16D 65/18* | (2006.01) | |
| *F16D 121/24* | (2012.01) | |
| *F16D 123/00* | (2012.01) | |
| *F16D 125/40* | (2012.01) | |
| *F16D 125/48* | (2012.01) | |

(52) U.S. Cl.
CPC .......... *F16D 65/18* (2013.01); *F16D 2121/24* (2013.01); *F16D 2123/00* (2013.01); *F16D 2125/40* (2013.01); *F16D 2125/48* (2013.01)

(58) Field of Classification Search
CPC .... F16D 65/18; F16D 65/183; F16D 2121/24; F16D 55/226; F16D 2123/00; F16D 2125/40; F16D 2125/48
See application file for complete search history.

(56) References Cited

U.S. PATENT DOCUMENTS

| | | | |
|---|---|---|---|
| 10,119,582 B2 | 11/2018 | Noguchi et al. | |
| 10,914,350 B2 | 2/2021 | Noguchi et al. | |
| 2021/0215215 A1* | 7/2021 | Kim | ...................... F16D 55/226 |
| 2022/0325765 A1* | 10/2022 | Chung | ................... F16D 65/66 |

FOREIGN PATENT DOCUMENTS

| | | |
|---|---|---|
| DE | 1 655 263 A1 | 2/1971 |
| JP | 2015194165 A | 11/2015 |
| JP | 2019215067 A | 12/2019 |

(Continued)

OTHER PUBLICATIONS

WO document No. 2016006581 to Maehara published on Jan. 14, 2016.*

(Continued)

*Primary Examiner* — Pamela Rodriguez
(74) *Attorney, Agent, or Firm* — Morgan, Lewis & Bockius LLP

(57) ABSTRACT

A brake apparatus for a vehicle may include: a pad unit disposed to face a disc unit; a first caliper body unit fixed to a vehicle body and configured to support the pad unit so that the pad unit is movable; a first pressing unit installed on the first caliper body unit so as to be movable forward or rearward and configured to press the pad unit to apply a main braking force; a second caliper body unit slidably installed on the first caliper body unit; and a second pressing unit installed on the first caliper body unit so as to be movable forward or rearward and configured to press the pad unit to apply a parking braking force together with the second caliper body unit.

11 Claims, 13 Drawing Sheets

(56) References Cited

FOREIGN PATENT DOCUMENTS

KR   10-2010-0098846 A   9/2010
KR       20170124743 A   11/2017

OTHER PUBLICATIONS

European Patent No. EP 3287657 to Bahmata et al published on Feb. 28, 2018.*
Office Action issued in corresponding German Patent Application No. 102022100167.9 dated Aug. 12, 2022.
Office Action issued in corresponding Korean patent application 10-2021-0127444 dated Feb. 16, 2023.

* cited by examiner

BRAKE APPARATUS FOR VEHICLE

CROSS-REFERENCE TO RELATED APPLICATION

This application claims priority from and the benefit of Korean Patent Application No. 10-2021-0127444, filed on Sep. 27, 2021, which is hereby incorporated by reference for all purposes as if set forth herein.

BACKGROUND

Technical Field

Exemplary embodiments of the present disclosure relate to a brake apparatus for a vehicle, and more particularly, to a brake apparatus for a vehicle having a fixed caliper and capable of simultaneously performing a main braking function and a parking braking function.

Discussion of the Background

In general, a brake apparatus for a vehicle refers to an apparatus for braking a vehicle by using a frictional force between a pad and a disc by bringing the pad and the disc into close contact with each other by pushing a piston using a hydraulic pressure generated by a master cylinder or a rotational force of a motor. A fixed caliper including a single caliper body may have a plurality of pistons inside and outside the fixed caliper with a disc interposed therebetween, thereby ensuring a high braking force compared to a layout. The fixed caliper is applied to medium-scale or large-scale SUVs and high-performance sedans and sports cars.

Because the fixed caliper in the related art has a structure in which a piston moves in the state in which the fixed caliper is fixed, it is difficult to couple a separate electronic parking apparatus thereto. Therefore, a separate parking brake apparatus is additionally installed thereto or a drum-type brake is used to ensure a function of the parking brake. However, in this case, there is a problem in that the number of components increases, the product is difficult to assemble, and a large amount of cost is required.

The background technology of the present disclosure is disclosed in Korean Patent Application Laid-Open No. 10-2010-0098846 (published on Sep. 10, 2010 and entitled 'Disc Brake Having Parking Function').

SUMMARY

Various embodiments are directed to a brake apparatus for a vehicle having a fixed caliper and capable of simultaneously performing a main braking function and a parking braking function.

In an embodiment, a brake apparatus includes: a pad unit disposed to face a disc unit; a first caliper body unit fixed to a vehicle body and configured to support the pad unit so that the pad unit is movable; a first pressing unit installed on the first caliper body unit so as to be movable forward or rearward and configured to press the pad unit to apply a main braking force; a second caliper body unit slidably installed on the first caliper body unit; and a second pressing unit installed on the first caliper body unit so as to be movable forward or rearward and configured to press the pad unit to apply a parking braking force together with the second caliper body unit.

The first caliper body unit may include: a first housing and a second housing symmetrically disposed with respect to the disc unit; a seating part disposed between the first housing and the second housing and configured to allow the second caliper body unit to be seated thereon; and a sleeve part extending from the second housing and configured to support the second caliper body unit so that the second caliper body unit is slidable.

The sleeve part may extend from the second housing in a direction parallel to an axial direction of the disc unit.

The second caliper body unit may include: a bridge part extending in an axial direction of the disc unit; a guide part extending from one side of the bridge part and slidably inserted into the sleeve part; and a finger part extending from another side of the bridge part and disposed to face the pad unit.

A central axis of the guide part may be disposed coaxially with a central axis of the second pressing unit and a central axis of the sleeve part.

The guide part may be slid by a pressing force applied to the pad unit by the second pressing unit, and bring the finger part into contact with the pad unit.

The brake apparatus may further include a restoration unit disposed between the sleeve part and the guide part and configured to move the guide part to an initial position thereof when the second pressing unit releases the pad unit.

The restoration unit may be elastically deformable and in contact with an outer peripheral surface of the sleeve part and an inner peripheral surface of the guide part.

A center of gravity of the second caliper body unit and a center of gravity of the second pressing unit may be disposed at positions facing an inner peripheral surface of the restoration unit.

The first pressing unit may include: a first piston part movably inserted into a first cylinder part concavely recessed into the first housing; and a second piston part movably inserted into a second cylinder part concavely recessed into the second housing.

The first piston part and the second piston part may respectively move forward or rearward in conjunction with hydraulic pressures transmitted to the insides of the first and second cylinder parts, respectively.

The second pressing unit may include: a third piston part movably inserted into a third cylinder part concavely recessed into the second housing; and a drive part connected to the third piston part and configured to generate driving power to move the third piston part forward or rearward.

A distance at which the third piston part is spaced apart from a central axis of the disc unit may be longer than a distance at which the first and second piston parts are spaced apart from the central axis of the disc unit.

The drive part may include: a power generating part fixed to the second caliper body unit and configured to generate a rotational force by external electric power; and a power transmission part connected to the power generating part and the third piston part and configured to convert a rotational motion of the power generating part into a rectilinear motion of the third piston part.

The power transmission part may have a screw thread formed on an outer peripheral surface thereof and be thread-coupled to an inner peripheral surface of the third piston part.

According to brake apparatus for a vehicle according to the present disclosure, it is possible to ensure the parking braking function using the second caliper body unit and the second pressing unit without a separate device.

In addition, according to the brake apparatus for a vehicle according to the present disclosure, the structure in which the sleeve part and the guide part are simply inserted may support the second caliper body unit so that the second caliper body unit is movable relative to the first caliper body unit, and transmit the reaction force applied to the third piston part directly to the guide part. As a result, it is possible to reduce the amount of processing and the number of components.

In addition, according to the brake apparatus for a vehicle according to the present disclosure, the third piston part for applying the parking braking force may be installed separately from the first and second piston parts for applying the main braking force. Therefore, it is possible to freely change the positions of the pistons depending on the specifications and usage conditions and the like.

In addition, according to the brake apparatus for a vehicle according to the present disclosure, the restoration unit may prevent foreign substances from being introduced between the sleeve part and the guide part, prevent drag of the guide part, and absorb vibration applied to the guide part. Therefore, it is possible to ensure the stable behavior performance.

In addition, according to the brake apparatus for a vehicle according to the present disclosure, the central axis of the guide part may be disposed coaxially with the central axis of the second pressing unit. Therefore, it is possible to prevent rotational moment of force from twisting or damaging the second caliper body unit when the guide part slides.

DETAILED DESCRIPTION OF THE ILLUSTRATED EMBODIMENTS

Figure 1:
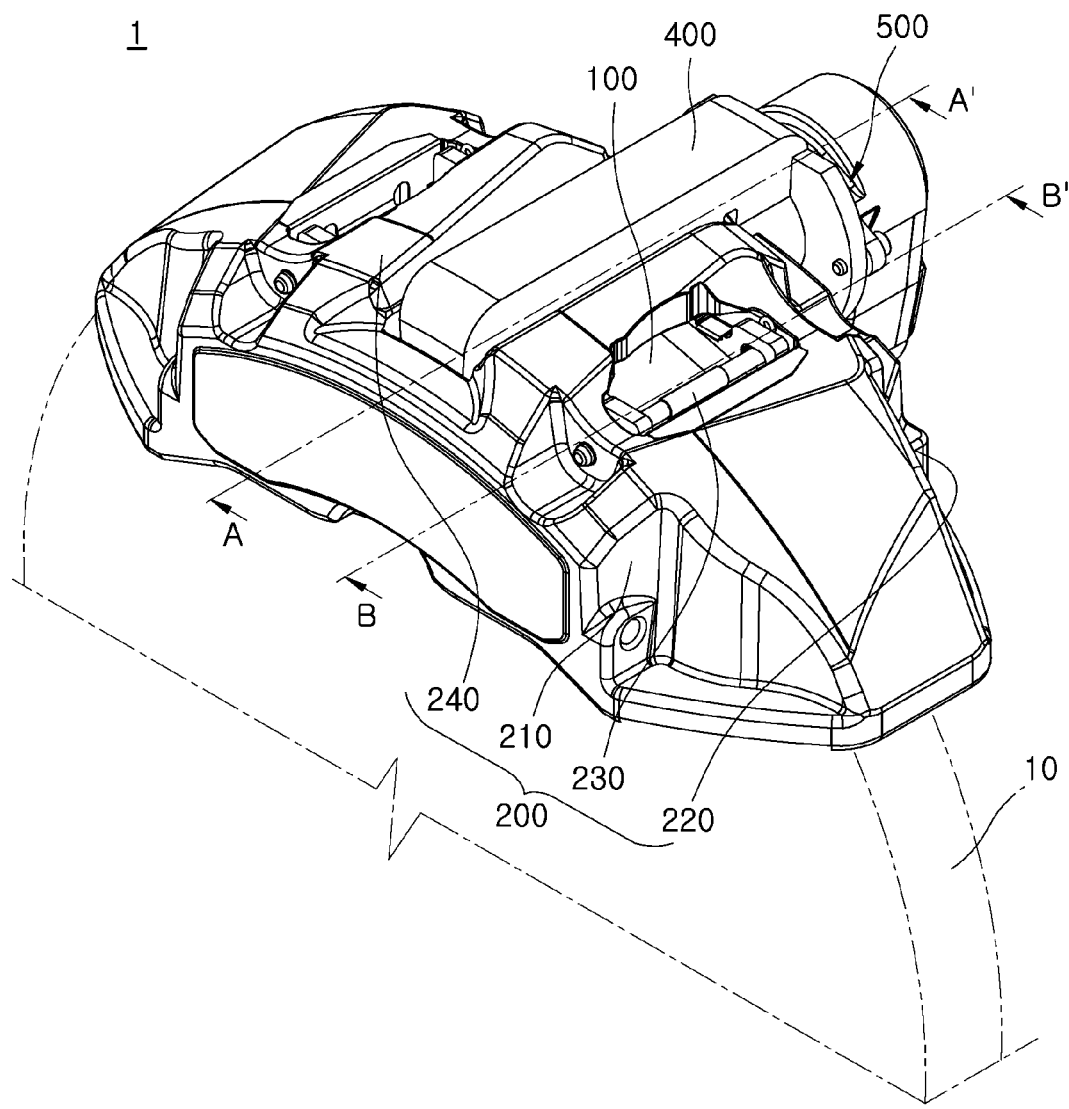
FIG. 1 is a perspective view schematically illustrating a configuration of a brake apparatus for a vehicle according to an embodiment of the present disclosure.

Hereinafter, a brake apparatus for a vehicle will be described with reference to the accompanying drawings through various embodiments.

Here, thicknesses of lines, sizes of constituent elements, or the like illustrated in the drawings, may be exaggerated for clarity and convenience of description. In addition, the terms used below are defined in consideration of the functions thereof in the present disclosure and may vary depending on the intention of a user or an operator or a usual practice. Therefore, such terms should be defined based on the entire contents of the present specification.

In addition, in the present specification, when one constituent element is referred to as being "connected to (or coupled to)" another constituent element, the constituent elements can be "directly connected to (coupled to)" each other, and can also be "indirectly connected to (coupled to)" each other with other elements interposed therebetween. In addition, unless explicitly described to the contrary, the word "comprise (or include)" and variations such as "comprises (or includes)" or "comprising (or including)" will be understood to imply the further inclusion of stated elements, not the exclusion of the stated elements.

In addition, throughout the specification, the same reference numerals denote the same constituent elements. Even though the same or similar reference numerals are not mentioned or described with reference to specific drawings, the same or similar reference numerals may be described with reference to the other drawings. In addition, even though there are parts denoted by no reference numeral in specific drawings, the parts may be described with reference to the other drawings. In addition, the numbers, shapes, sizes, relative differences in sizes, and the like of the detailed constituent elements illustrated in the drawings of the present application are set for convenience of understanding, do not limit the embodiments, and may be variously implemented.

Figure 2:
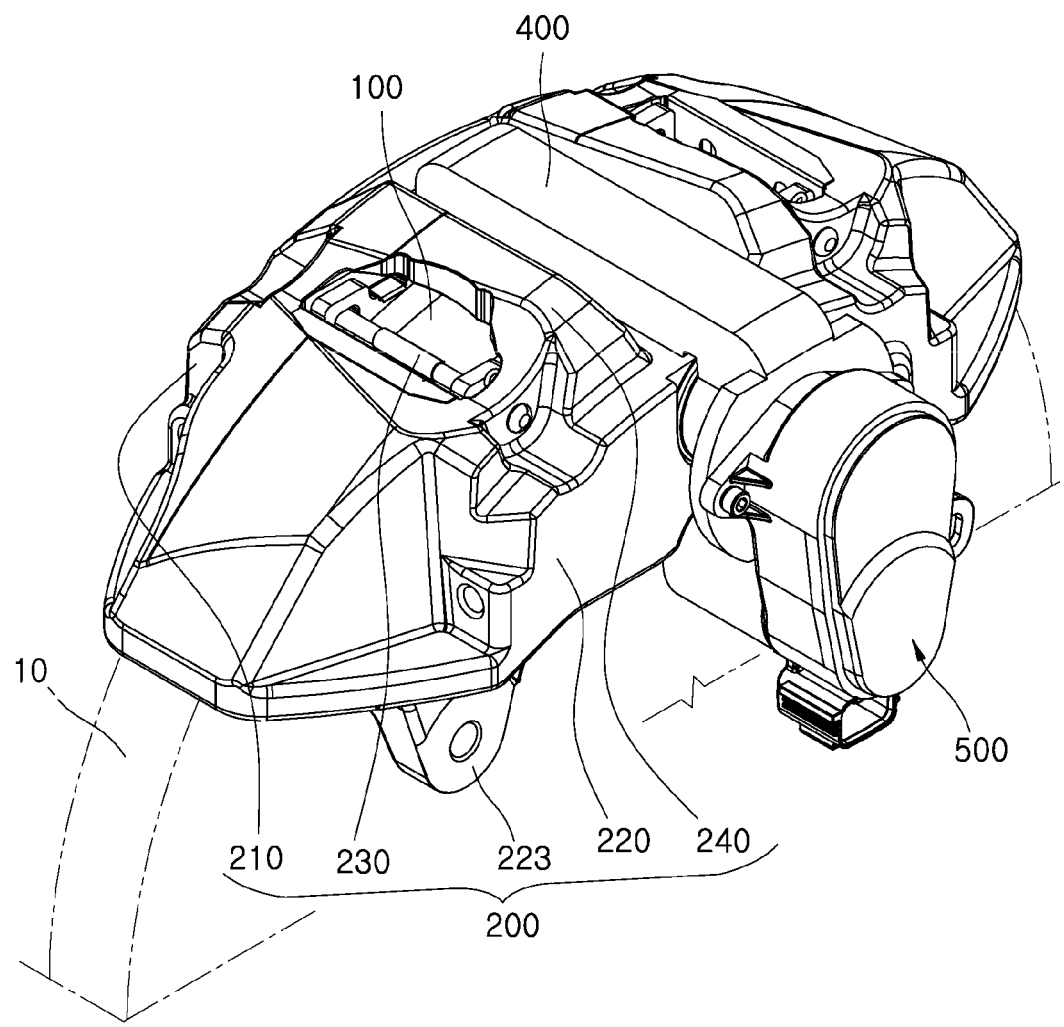
FIG. 2 is a perspective view illustrating the configuration of the brake apparatus for a vehicle according to the embodiment of the present disclosure at a point in time different from a point in time illustrated in FIG. 1.
Figure 3:
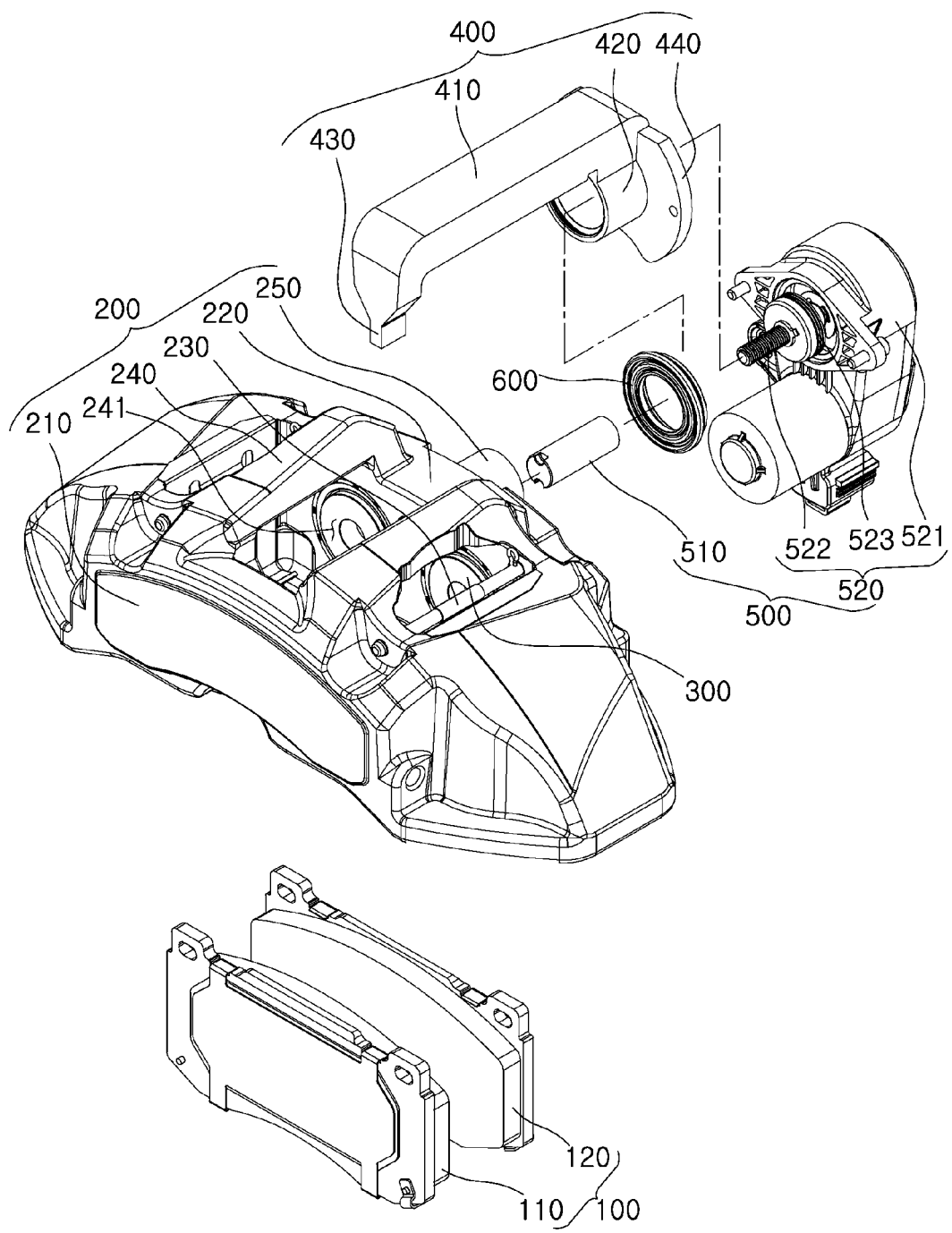
FIG. 3 is an exploded perspective view schematically illustrating the configuration of the brake apparatus for a vehicle according to the embodiment of the present disclosure.
Figure 4:
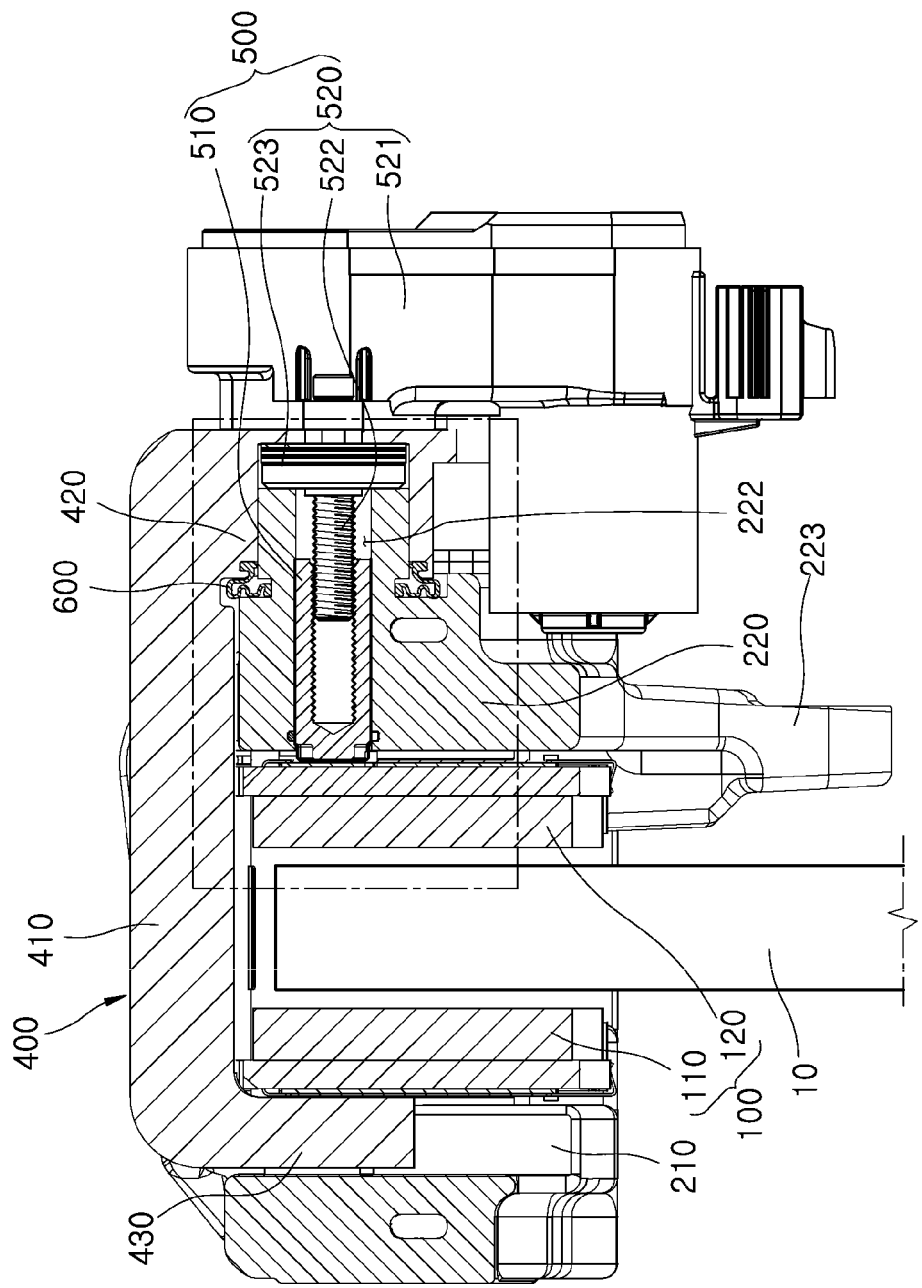
FIG. 4 is a cross-sectional view taken along line A-A' and illustrating the configuration of the brake apparatus for a vehicle according to the embodiment of the present disclosure.
Figure 5:
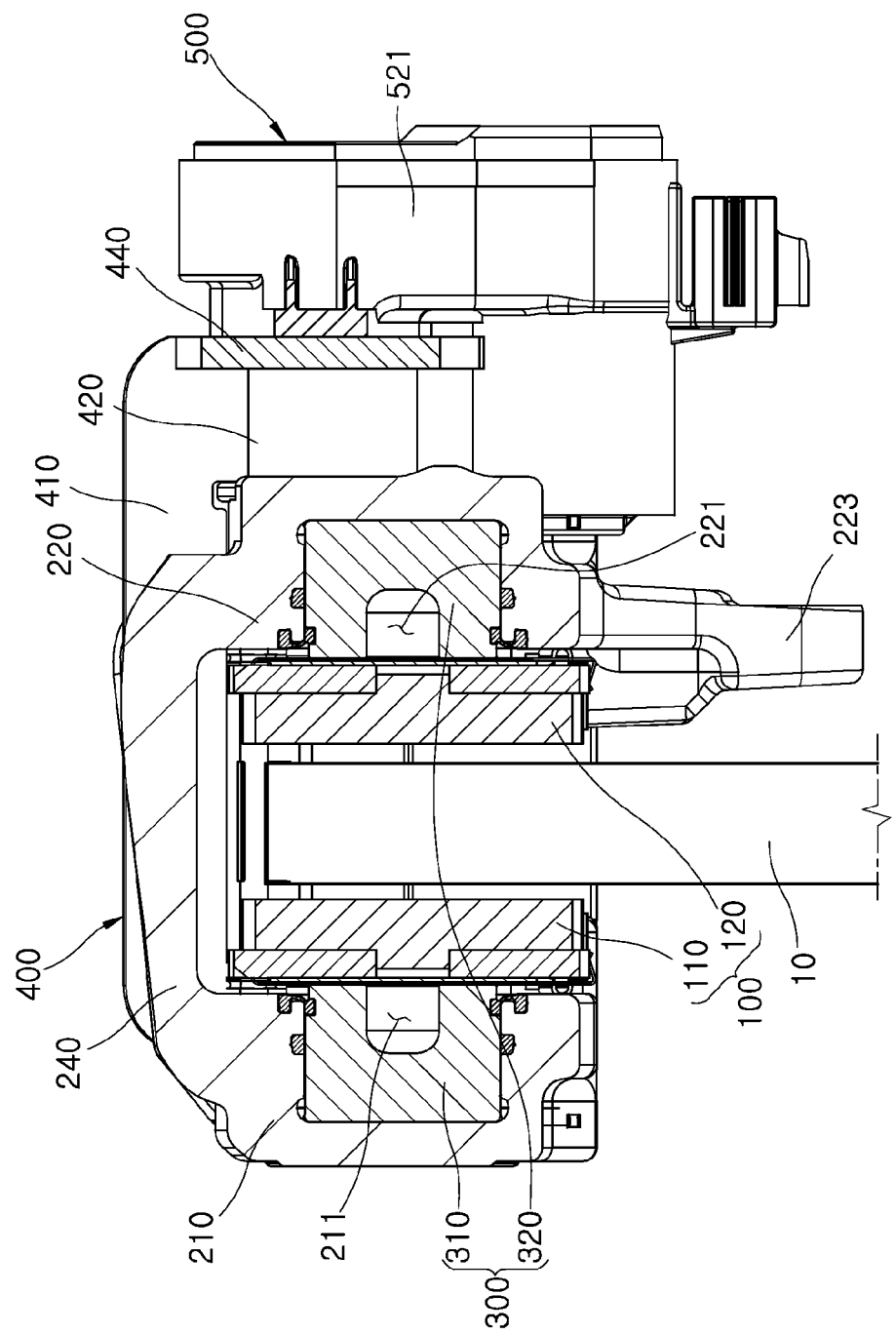
FIG. 5 is a cross-sectional view taken along line B-B' and illustrating the configuration of the brake apparatus for a vehicle according to the embodiment of the present disclosure.

FIG. 1 is a perspective view schematically illustrating a configuration of a brake apparatus for a vehicle according to an embodiment of the present disclosure, FIG. 2 is a perspective view illustrating the configuration of the brake apparatus for a vehicle according to the embodiment of the present disclosure at a point in time different from a point in time illustrated in FIG. 1, FIG. 3 is an exploded perspective view schematically illustrating the configuration of the brake apparatus for a vehicle according to the embodiment of the present disclosure, FIG. 4 is a cross-sectional view taken along line A-A' and illustrating the configuration of the configuration of the brake apparatus for a vehicle according to the embodiment of the present disclosure, and FIG. 5 is a cross-sectional view taken along line B-B' and illustrating the configuration of the brake apparatus for a vehicle according to the embodiment of the present disclosure.

Referring to FIGS. 1 to 6, a brake apparatus 1 for a vehicle according to an embodiment of the present disclosure includes a pad unit 100, a first caliper body unit 200, a first pressing unit 300, a second caliper body unit 400, a second pressing unit 500, and a restoration unit 600.

The pad unit 100 is disposed to face a disc unit 10 that rotates together with a wheel of a vehicle. The pad unit 100 according to the embodiment of the present disclosure includes a first pad part 110 and a second pad part 120.

The first and second pad parts 110 and 120 are symmetrically disposed with the disc unit 10 interposed therebetween. That is, the first and second pad parts 110 and 120 are spaced apart from each other at a predetermined interval in an axial direction of the disc unit 10 and have inner surfaces that face two opposite surfaces of the disc unit 10. The first and second pad parts 110 and 120 are supported on the first caliper body unit 200 to be described below so as to be slidable in a direction parallel to the axial direction of the disc unit 10. The first and second pad parts 110 and 120 come into contact with the disc unit 10 or separate from the disc unit 10. A friction pad made of a material, such as rubber, with a high frictional coefficient may be attached to each of the inner surfaces of the first and second pad parts 110 and 120 that face the disc unit 10.

The first and second pad parts 110 and 120 come into contact with or separate from the disc unit 10 while reciprocating in the direction parallel to the axial direction of the disc unit 10 in conjunction with a pressing force applied by the first pressing unit 300 or the second pressing unit 500 which will be described below. When the first and second pad parts 110 and 120 come into contact with the disc unit 10, the first and second pad parts 110 and 120 apply a braking force to the vehicle while interfering with the rotation of the disc unit 10. When the first and second pad parts 110 and 120 separate from the disc unit 10, the first and second pad parts 110 and 120 permit the rotation of the disc unit 10, thereby releasing the braking force applied to the vehicle. The specific shapes of the first and second pad parts 110 and 120 are not limited to the shapes illustrated in FIG. 3 and may be variously changed in design within the technical spirit of a brake pad that comes into contact with the disc unit 10.

The first caliper body unit 200 is fixed to a vehicle body and supports the pad unit 100 so that the pad unit 100 is movable in the direction parallel to the axial direction of the disc unit 10. The first caliper body unit 200 defines a space in which the first pressing unit 300, the second caliper body unit 400, the second pressing unit 500, and the restoration unit 600 may be installed.

The first caliper body unit 200 according to the embodiment of the present disclosure includes a first housing 210, a second housing 220, support parts 230, seating parts 240, and a sleeve part 250.

The first and second housings 210 and 220 define external appearances of two opposite sides of the first caliper body unit 200. The first and second housings 210 and 220 are symmetrically disposed with respect to the disc unit 10. That is, the first and second housings 210 and 220 face each other and are spaced apart from each other at a predetermined interval in the axial direction of the disc unit 10 with the disc unit 10 and the pad unit 100 interposed therebetween.

Figure 6:
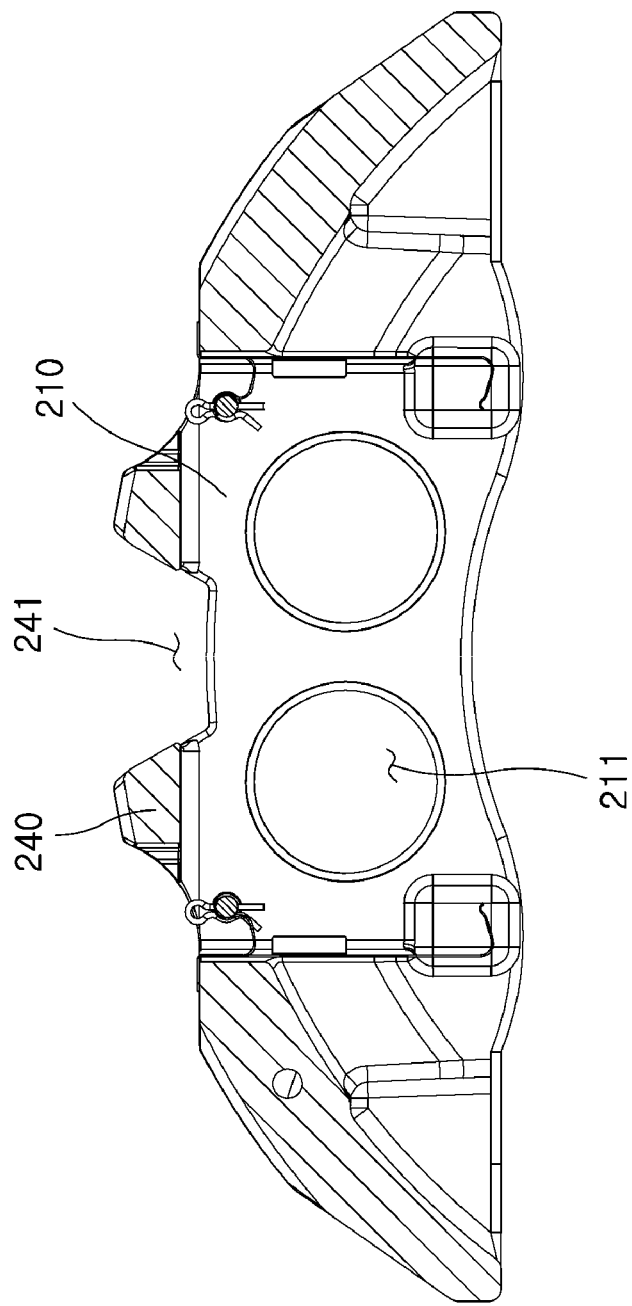
FIG. 6 is a front view schematically illustrating a configuration of a first housing according to the embodiment of the present disclosure.

FIG. 6 is a front view schematically illustrating a configuration of the first housing according to the embodiment of the present disclosure.

Referring to FIGS. 3 and 6, a longitudinal direction of the first housing 210 according to the embodiment of the present disclosure extends in a circumferential direction of the disc unit 10. Therefore, the first housing 210 may have an approximately arc shape. An inner surface of the first housing 210 faces an outer surface of the first pad part 110.

The first housing 210 has a first cylinder part 211 that supports a first piston part 310 of the first pressing unit 300, which will be described below, so that the first piston part 310 is movable. The first cylinder part 211 according to the embodiment of the present disclosure may be provided in the form of a chamber concavely recessed into the first housing 210 from the inner surface of the first housing 210 that faces the first pad part 110. A longitudinal direction of the first cylinder part 211 is parallel to the axial direction of the disc unit 10. The first cylinder part 211 is provided in plural, and the plurality of first cylinder parts 211 may be disposed to be spaced apart from one another at predetermined intervals in the longitudinal direction of the first housing 210. The interior of the first cylinder part 211 is filled with a braking liquid. The first cylinder part 211 may form a hydraulic pressure therein by means of the braking liquid.

Figure 7:
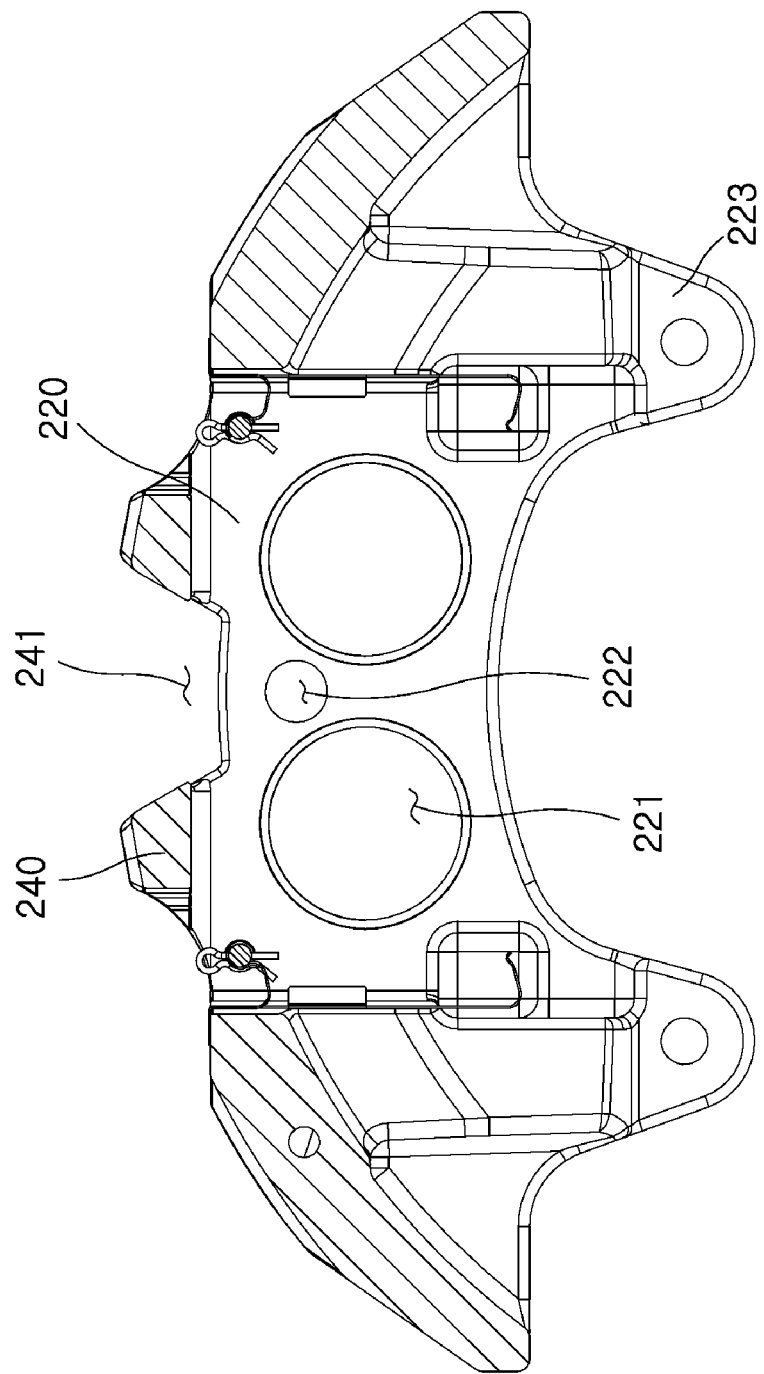
FIG. 7 is a front view schematically illustrating a configuration of a second housing according to the embodiment of the present disclosure.

FIG. 7 is a front view schematically illustrating a configuration of the second housing according to the embodiment of the present disclosure.

Referring to FIGS. 3 and 7, a longitudinal direction of the second housing 220 according to the embodiment of the present disclosure extends in the circumferential direction of the disc unit 10. Therefore, the second housing 220 may have an approximately arc shape. An inner surface of the second housing 220 faces an outer surface of the second pad part 120.

The second housing 220 has a second cylinder part 221 that supports a second piston part 320 of the first pressing unit 300 so that the second piston part 320 is movable. The second cylinder part 221 according to the embodiment of the present disclosure may be provided in the form of a chamber concavely recessed into the second housing 220 from the inner surface of the second housing 220 that faces the second pad part 120. A longitudinal direction of the second cylinder part 221 is parallel to the axial direction of the disc unit 10. The second cylinder part 221 is provided in plural, and the plurality of second cylinder parts 221 may be disposed to be spaced apart from one another at predetermined intervals in the longitudinal direction of the second housing 220. The interior of the second cylinder part 221 is filled with a braking liquid. The second cylinder part 221 may form a hydraulic pressure therein by means of the braking liquid.

Any one of the first cylinder part 211 and the second cylinder part 221 may have a hydraulic port (not illustrated) through which the braking liquid is received from the outside or the braking liquid is discharged to the outside. In this case, the first cylinder part 211 and the second cylinder part 221 may communicate with each other through a separate transmission flow path (not illustrated). Therefore, the hydraulic pressure formed in the first cylinder part 211 and the hydraulic pressure formed in the second cylinder part 221 may be synchronized with each other.

The second housing 220 has a third cylinder part 222 that supports a third piston part 510 of the second pressing unit 500 so that the third piston part 510 is movable. The third cylinder part 222 according to the embodiment of the present disclosure may be provided in the form of a chamber concavely recessed into the second housing 220 from the inner surface of the second housing 220 that faces the second pad part 120. A longitudinal direction of the third cylinder part 222 is parallel to the axial direction of the disc unit 10. When a pair of second cylinder parts 221 is provided, the third cylinder part 222 may be disposed between the pair of second cylinder parts 221.

The third cylinder part 222 may be disposed at a relatively higher position than the second cylinder part 221. That is, a distance at which the third cylinder part 222 is spaced apart from a central axis of the disc unit 10 may be longer than a distance at which the second cylinder part 221 is spaced apart from the central axis of the disc unit 10. Therefore, when the pad unit 100 and the disc unit 10 are brought into contact with each other by the second pressing unit 500 to be described below, the third cylinder part 222 increases a magnitude of an effective radius by which the braking force is applied, which makes it possible to improve parking braking efficiency.

The second housing 220 has fixing parts 223 fixed to the vehicle body and configured to support the entire first caliper body unit 200. The fixing part 223 according to the embodiment of the present disclosure may be provided in the form of a bracket perpendicularly extending from a lower end of the second housing 220. The fixing part 223 may be detachably fixed to the vehicle body by a bolt or the like. A pair of fixing parts 223 may be provided, and the pair of fixing parts 223 may be disposed at two opposite sides of the second housing 220 and spaced apart from each other at a predetermined interval.

The support part 230 is installed between the first and second housings 210 and 220 and supports the pad unit 100 so that the pad unit 100 is movable. The support part 230 according to the embodiment of the present disclosure may be provided in the form of a rod having two opposite ends respectively fixed to the inner surfaces of the first and second housings 210 and 220. The support part 230 is disposed in the direction parallel to the axial direction of the disc unit 10. A pair of support parts 230 may be provided, and the pair of support parts 230 is spaced apart from each other at a predetermined interval in the longitudinal direction of the first and second housings 210 and 220. The two opposite sides of each of the first and second pad parts 110 and 120 are slidably connected to the pair of support parts 230, respectively, by a hook, a ring, or the like.

The seating part 240 is disposed between the first and second housings 210 and 220 and defines an upper external appearance of the first caliper body unit 200. The seating part 240 according to the embodiment of the present disclosure extends in the axial direction of the disc unit 10 and is disposed to cover an upper side of the disc unit 10. Two opposite ends of the seating part 240 are respectively and integrally connected to upper ends of the first and second housings 210 and 220.

The seating parts 240 define a seating groove 241 in which a bridge part 410 of the second caliper body unit 400, which will be described below, is seated. The seating groove 241 according to the embodiment of the present disclosure may be provided in the form of a hole that perpendicularly penetrates a central portion between the seating parts 240 in a radial direction of the disc unit 10. A longitudinal direction of the seating groove 241 extends in the axial direction of the disc unit 10. An inner surface of the seating groove 241 faces an outer surface of the bridge part 410.

The sleeve part 250 extends from the second housing 220 and supports the second caliper body unit 400 to be described below so that the second caliper body unit 400 is slidable. The sleeve part 250 according to the embodiment of the present disclosure extends from an outer surface of the second housing 220 in a direction parallel to the axial direction of the disc unit 10. The sleeve part 250 has a vacant inner space and communicates with the second cylinder part 221. A central axis of the sleeve part 250 is disposed coaxially with a central axis of the second cylinder part 221. A cross-sectional shape of the sleeve part 250 may be changed in design to have various shapes such as a polygonal or elliptical shape in addition to a circular shape.

The first pressing unit 300 is installed on the first caliper body unit 200 so as to be movable forward or rearward. When moving forward, the first pressing unit 300 presses the pad unit 100 to apply a main braking force. In this case, for example, the main braking force may be a braking force generated when the pad unit 100 comes into contact with the disc unit 10 as a driver manipulates a brake pedal while the vehicle travels.

The first pressing unit 300 according to the embodiment of the present disclosure may include the first piston part 310 and the second piston part 320.

The first piston part 310 is slidably inserted into the first cylinder part 211. The first piston part 310 according to the embodiment of the present disclosure has an approximately cylindrical shape and is inserted into the first cylinder part 211. A front end of the first piston part 310 faces the outer surface of the first pad part 110. The first piston part 310 moves forward or rearward in the longitudinal direction of the first cylinder part 211, i.e., the direction parallel to the axial direction of the disc unit 10 in conjunction with the hydraulic pressure formed in the first cylinder part 211. When the first piston part 310 moves forward, a front surface portion of the first piston part 310 presses the outer surface of the first pad part 110 and brings the first pad part 110 into contact with the disc unit 10, thereby generating the braking force. The first piston part 310 may be provided in plural. In this case, the plurality of first piston parts 310 may be slidably inserted into the plurality of first cylinder parts 211, respectively. A sealing member may be installed between an outer peripheral surface of the first piston part 310 and an inner peripheral surface of the first cylinder part 211 and prevent the braking liquid which fills the interior of the first cylinder part 211, from leaking to the outside.

The second piston part 320 is slidably inserted into the second cylinder part 221. The second piston part 320 according to the embodiment of the present disclosure has an approximately cylindrical shape and is inserted into the second cylinder part 221. A front end of the second piston part 320 faces the outer surface of the second pad part 120. The second piston part 320 moves forward or rearward in the longitudinal direction of the second cylinder part 221, i.e., the direction parallel to the axial direction of the disc unit 10 in conjunction with the hydraulic pressure formed in the second cylinder part 221. When the second piston part 320 moves forward, a front surface portion of the second piston part 320 presses the outer surface of the second pad part 120 and brings the second pad part 120 into contact with the disc unit 10, thereby generating the braking force. The second piston part 320 may be provided in plural. In this case, the plurality of second piston parts 320 may be slidably inserted into the plurality of second cylinder parts 221, respectively. A sealing member may be installed between an outer peripheral surface of the second piston part 320 and an inner peripheral surface of the second cylinder part 221 and prevent the braking liquid, which fills the interior of the second cylinder part 221, from leaking to the outside.

The second caliper body unit 400 is slidably installed on the first caliper body unit 200. The second caliper body unit 400 moves relative to the first caliper body unit 200 in conjunction with the forward or rearward movement of the second pressing unit 500 to be described below. The second caliper body unit 400 moves toward one side and presses the pad unit 100 to apply a parking braking force together with the second pressing unit 500. In this case, for example, the parking braking force may be a braking force generated when the pad unit 100 comes into contact with the disc unit 10 as a driver manipulates a parking brake button when the driver parks or stops the vehicle.

Figure 8:
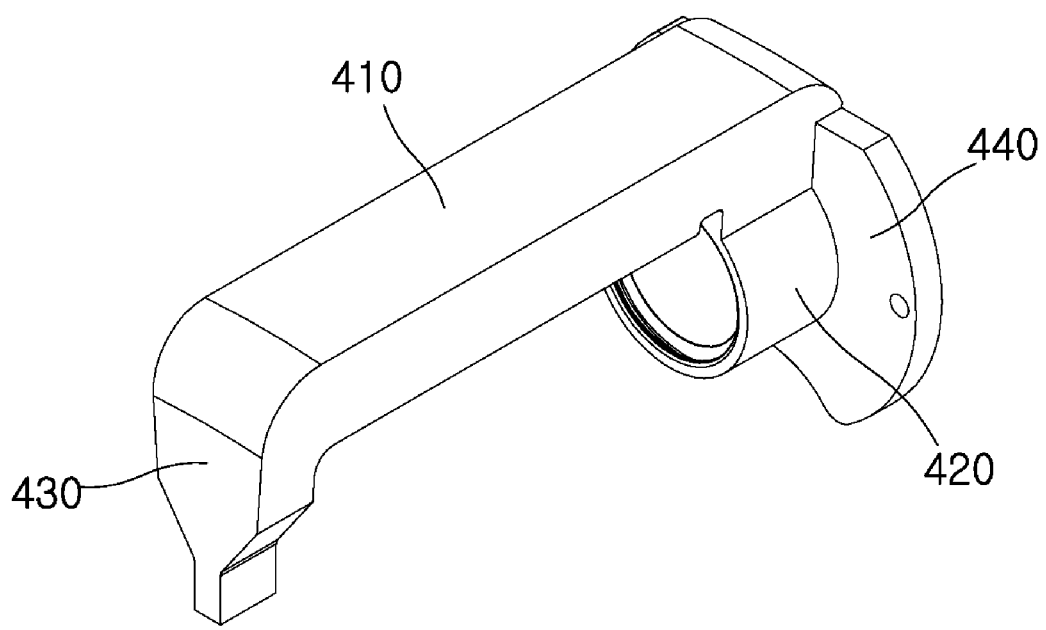
FIG. 8 is a perspective view schematically illustrating a configuration of a second caliper body unit according to the embodiment of the present disclosure.

FIG. 8 is a perspective view schematically illustrating a configuration of the second caliper body unit according to the embodiment of the present disclosure.

Referring to FIGS. 1 to 8, the second caliper body unit 400 according to the embodiment of the present disclosure includes the bridge part 410, a guide part 420, a finger part 430, and a flange part 440.

The bridge part 410 defines an external appearance of a central portion of the second caliper body unit 400 and overall supports the guide part 420, the finger part 430, and the flange part 440, which will be described below. The bridge part 410 according to the embodiment of the present disclosure may have an approximately rod. A longitudinal direction of the bridge part 410 is disposed in the direction parallel to the axial direction of the disc unit 10. The bridge part 410 is seated in the seating groove 241 formed at the central portion between the seating parts 240. Two opposite surfaces of the bridge part 410 face the inner surface of the seating groove 241.

The guide part 420 extends from one side of the bridge part 410 and defines a rear external appearance of the second caliper body unit 400. The guide part 420 is slidably inserted into the sleeve part 250 and guides the sliding of the second caliper body unit 400. The guide part 420 according to the embodiment of the present disclosure may have a cylindrical shape opened at one side thereof. An upper end of the guide part 420 is integrally connected to a lower surface of a rear end of the bridge part 410. An inner diameter of the guide part 420 has a size corresponding to an outer diameter of the sleeve part 250. The sleeve part 250 is inserted into the guide part 420 through an open side of the guide part 420. An inner peripheral surface of the guide part 420 is in slidable contact with an outer peripheral surface of the sleeve part 250.

The guide part 420 slides in the direction parallel to the axial direction of the disc unit 10 by a reaction force applied in a direction opposite to the pressing force applied to the pad unit 100 by the second pressing unit 500. A central axis of the guide part 420 is disposed coaxially with a central axis of the sleeve part 250 and a central axis of the third piston part 510 of the second pressing unit 500 to be described below. Therefore, the central axis of the sliding of the guide part 420 may be coincident with the central axis of the reaction force transmitted from the second pressing unit 500, which makes it possible to prevent the second caliper body unit 400 from being twisted or damaged by rotational moment of force.

The finger part 430 extends from the other side of the bridge part 410 and defines a front external appearance of the second caliper body unit 400. The finger part 430 presses or releases the pad unit 100 in conjunction with the sliding of the guide part 420. The finger part 430 according to the embodiment of the present disclosure may be provided in the form of a rod perpendicularly extending downward from a front end of the bridge part 410. The finger part 430 may be integrated with the bridge part 410 by welding, pressing, bending, or the like. The finger part 430 penetrates the seating groove 241, and an inner surface of the finger part 430 faces the outer surface of the first pad part 110. When the guide part 420 slides, the finger part 430 slides together with the guide part 420 by means of the bridge part 410.

The flange part 440 extends from the guide part 420 and defines a space in which a drive part 520 to be described below may be supported. The flange part 440 according to the embodiment of the present disclosure may be provided in the form of a circular plate extending in a radial direction of the guide part 420 from an outer peripheral surface of a rear end of the guide part 420. The flange part 440 may have a plurality of coupling holes that penetrates the flange part 440 in a direction perpendicular to the axial direction of the disc unit 10. The plurality of coupling holes is spaced apart from one another at predetermined intervals in a circumferential direction of the flange part 440.

The second pressing unit 500 is installed on the first caliper body unit 200 so as to be movable forward or rearward. The second pressing unit 500 moves forward and presses the pad unit 100 to guide the sliding of the second caliper body unit 400 and apply the parking braking force together with the second caliper body unit 400.

The second pressing unit 500 according to the embodiment of the present disclosure includes the third piston part 510 and the drive part 520.

The third piston part 510 is slidably inserted into the third cylinder part 222. The third piston part 510 according to the embodiment of the present disclosure has a cylindrical shape having a vacant space and is inserted into the second cylinder part 221. A front end of the third piston part 510 faces the outer surface of the second pad part 120. A rear end of the third piston part 510 is opened so that a power transmission part 522 to be described below is inserted into the third piston part 510. A screw thread is formed on an inner peripheral surface of the third piston part 510, and the screw thread extends in a spiral shape in a longitudinal direction of the third piston part 510. The third piston part 510 moves forward or rearward in the longitudinal direction of the third cylinder part 222, i.e., the direction parallel to the axial direction of the disc unit 10 in conjunction with an operation of the drive part 520 to be described below. When the third piston part 510 moves forward, a front surface portion of the third piston part 510 presses the outer surface of the second pad part 120 and brings the second pad part 120 into contact with the disc unit 10, thereby generating the braking force. The third piston part 510 is installed so as not to rotate about a central axis thereof. Therefore, the third piston part 510 may be stably moved forward or rearward by a rotational force transmitted from the drive part 520 to be described below.

The third piston part 510 may be disposed at a relatively higher position than the first piston part 310 and the second piston part 320. That is, a distance at which the third piston part 510 is spaced apart from the central axis of the disc unit 10 may be longer than a distance at which the first and second piston parts 310 and 320 are spaced apart from the central axis of the disc unit 10. Therefore, when the pad unit 100 and the disc unit 10 come into contact with each other, the third piston part 510 increases an effective radius by which the braking force is applied, thereby improving the parking braking efficiency.

The drive part 520 is connected to the third piston part 510, generates driving power during parking and braking of the vehicle, and moves the third piston part 510 forward or rearward.

The drive part according to the embodiment of the present disclosure includes a power generating part 521, the power transmission part 522, and a bearing part 523.

The power generating part 521 is fixed to the second caliper body unit 400 and generates the rotational force by electric power applied from the outside. The power generating part 521 according to the embodiment of the present disclosure faces a rear surface of the flange part 440 and is fixed to the flange part 440 by a bolt or the like. The power generating part 521 may include a speed reducer and an electric motor configured to generate the rotational force by electric power applied from a battery or the like in the vehicle.

Two opposite sides of the power transmission part 522 are respectively connected to the power generating part 521 and the third piston part 510. The power transmission part 522 converts a rotational motion of the power generating part 521 into a rectilinear motion of the third piston part 510. The power transmission part 522 according to the embodiment of the present disclosure may be provided in the form of a rod having a screw thread formed on an outer peripheral surface thereof. The power transmission part 522 is disposed in the direction parallel to the axial direction of the disc unit 10. A central axis of the power transmission part 522 is disposed coaxially with the central axis of the third cylinder part 222, the central axis of the guide part 420, and the central axis of the third piston part 510. One side of the power transmission part 522 is connected to an output shaft of the power generating part 521, and the power transmission part 522 is rotated about the central axis thereof by the rotational force generated by the power generating part 521. The other side of the power transmission part 522 penetrates the guide part 420 and is disposed in the third cylinder part 222 and thread-coupled to the inner peripheral surface of the third piston part 510. Therefore, the power transmission part 522 may rotate relative to the third piston part 510 and move the third piston part 510 forward or rearward in the direction parallel to the axial direction of the disc unit 10.

The bearing part 523 is installed between the guide part 420 and the power transmission part 522 and supports the power transmission part 522 so that the power transmission part 522 is rotatable relative to the guide part 420. For example, the bearing part 523 according to the embodiment of the present disclosure may be a thrust bearing having one side rotatably connected to the power transmission part 522 so that the bearing part 523 rotates together with the power transmission part 522, and the other side fixed to an inner surface of the guide part 420. Therefore, the bearing part 523 may prevent the reaction force from separating the power transmission part 522 from the third cylinder part 222, the reaction force being generated by the contact between the third piston part 510 and the second pad part 120. In addition, the bearing part 523 may guide the transmission of the reaction force to the guide part 420, the reaction force being generated by the contact between the third piston part 510 and the second pad part 120.

The restoration unit 600 is provided between the sleeve part 250 and the guide part 420 and uses an elastic restoring force thereof to perform sealing, damping, and a reduction in drag. More specifically, the restoration unit 600 moves the guide part 420 to an initial position thereof when the second pressing unit 500 releases the pad unit 100. In this case, for example, the initial position of the guide part 420 may indicate a position of the guide part 420 in a state in which the finger part 430 is maximally spaced apart from the first pad part 110 before the second pressing unit 500 operates. For example, the initial position of the guide part 420 may be a position of the guide part 420 illustrated in FIG. 4. The restoration unit 600 absorbs vibration generated when the guide part 420 slides. The restoration unit 600 seals a portion between the sleeve part 250 and the guide part 420 and prevents the penetration of foreign substances.

Figure 9:
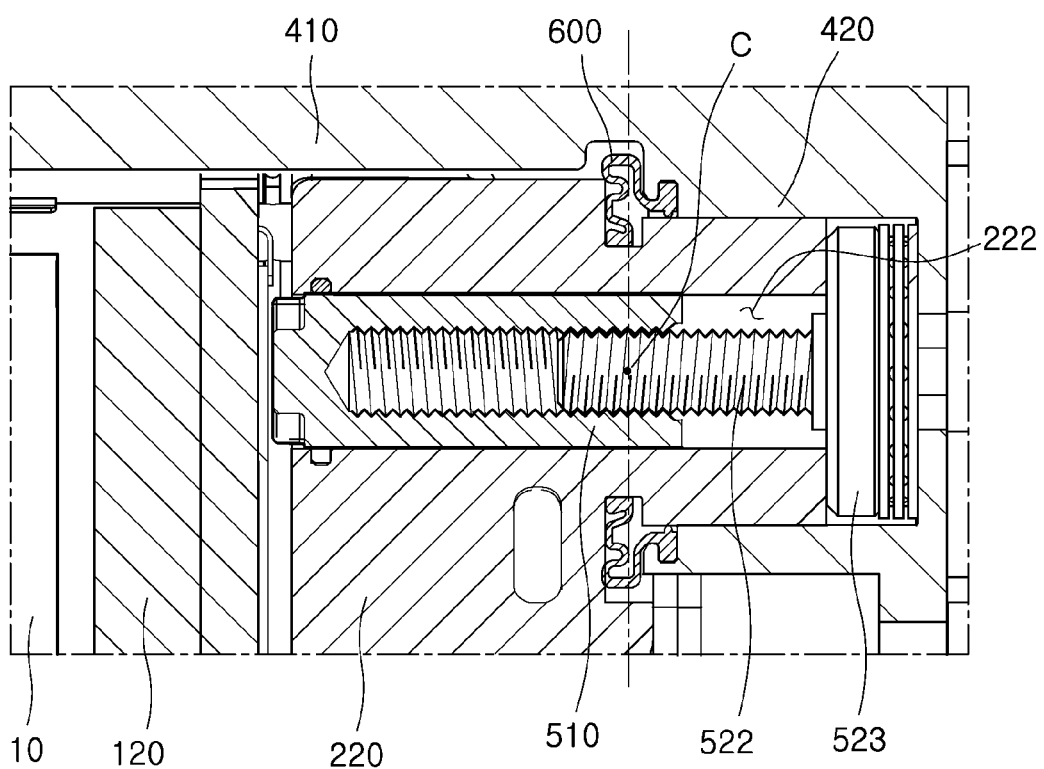
FIG. 9 is an enlarged view schematically illustrating a configuration of a restoration unit according to the embodiment of the present disclosure.

FIG. 9 is an enlarged view schematically illustrating a configuration of the restoration unit according to the embodiment of the present disclosure.

Referring to FIG. 9, the restoration unit 600 according to the embodiment of the present disclosure may be provided in the form of a circular ring. The restoration unit 600 may be made of an elastically deformable material such as rubber or silicone. An inner peripheral surface and an outer peripheral surface of the restoration unit 600 are in close contact with and fixed to the outer peripheral surface of the sleeve part 250 and the inner peripheral surface of the guide part 420, respectively. As illustrated in FIG. 9, a cross-sectional shape of the restoration unit 600 may have a corrugated pipe shape or have a circular shape, a polygonal shape, or the like.

A center of gravity C of the second caliper body unit 400 and a center of gravity C of the second pressing unit 500 may be disposed on the central axis of the third cylinder part 222 and the central axis of the guide part 420 and provided at positions facing the inner peripheral surface of the restoration unit 600. In this case, the center of gravity C of the second caliper body unit 400 and the center of gravity C of the second pressing unit 500 mean the points at which no net torque is generated by gravity. Therefore, the restoration unit 600 may support both the sleeve part 250 and the guide part 420 on the same plane as the center of gravity C of the second caliper body unit 400 and the center of gravity C of the second pressing unit 500. Therefore, the restoration unit 600 may maximize the damping performance and prevent the leftward or rightward rolling of the second caliper body unit 400 caused by the rotational moment of force.

Hereinafter, an operation of the brake apparatus 1 for a vehicle according to the embodiment of the present disclosure will be described in detail.

Figure 10:
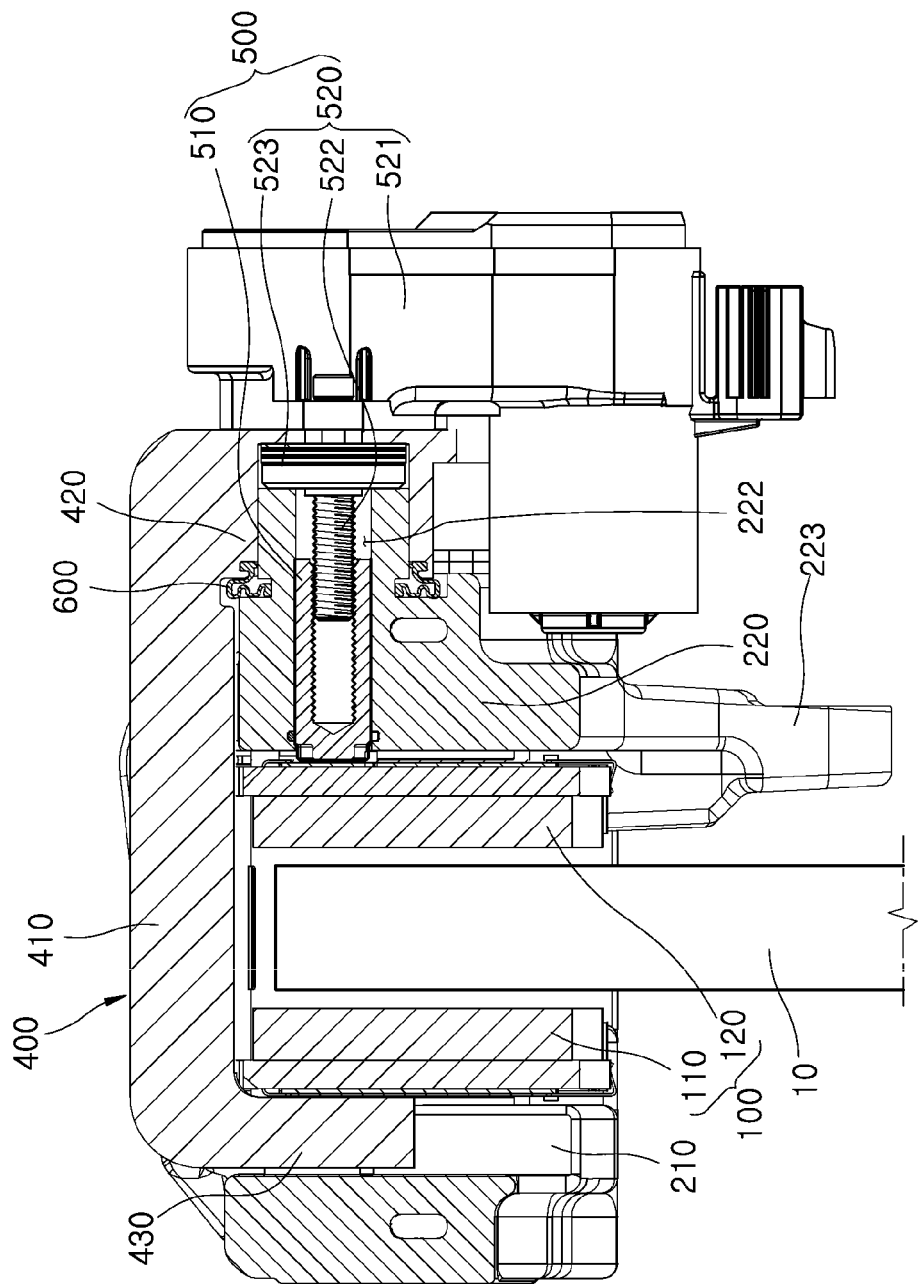
FIGS. 10 and 11 are operational views schematically illustrating a process in which the brake apparatus for a vehicle according to the embodiment of the present disclosure applies a main braking force.
Figure 11:
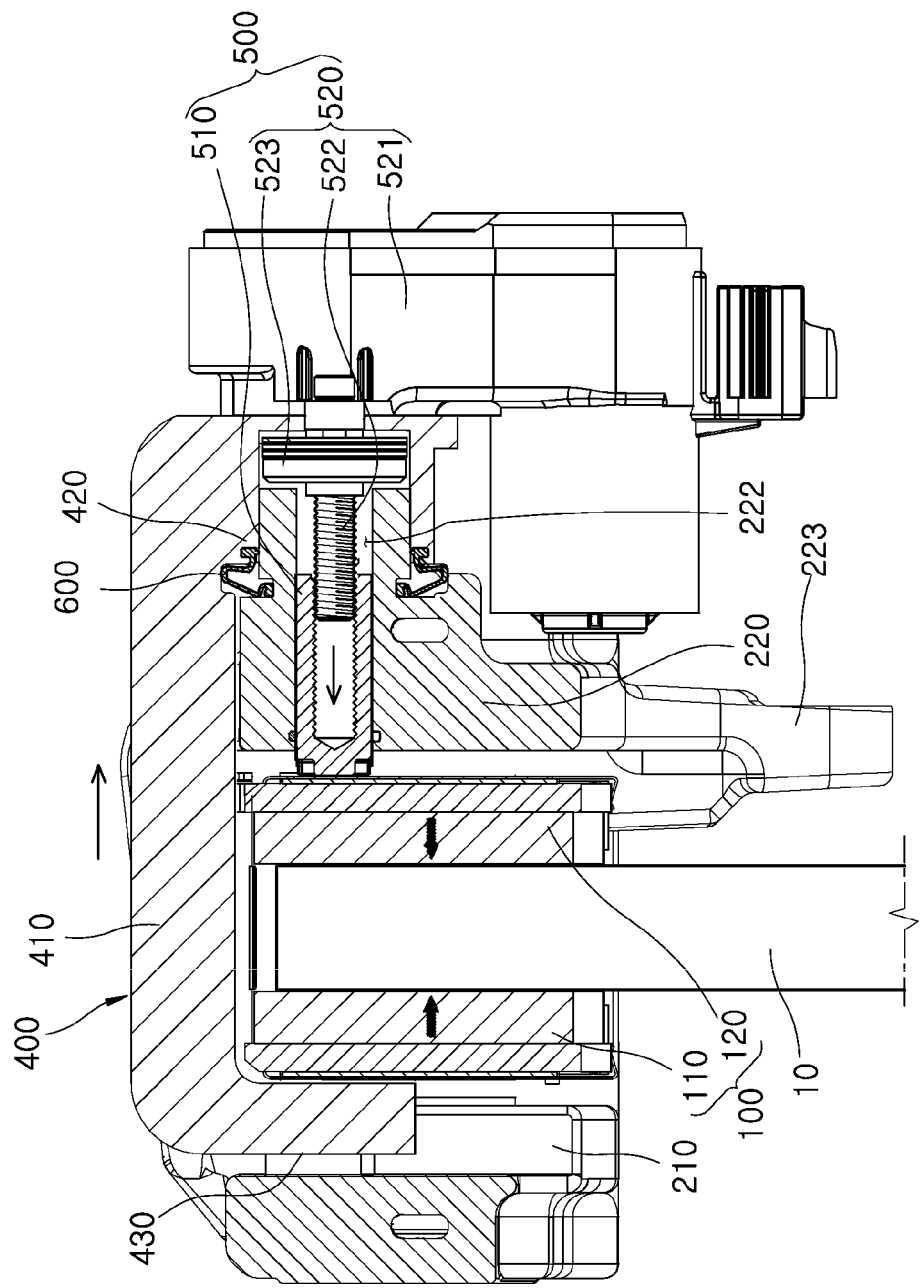

FIGS. 10 and 11 are operational views schematically illustrating a process in which the brake apparatus for a vehicle according to the embodiment of the present disclosure applies the main braking force.

Referring to FIGS. 10 and 11, when a driver pushes a brake pedal while a vehicle travels, the first and second cylinder parts 211 and 221 form the hydraulic pressure by means of the braking liquid introduced thereinto.

The first and second piston parts 310 and 320 respectively move forward toward the first and second pad parts 110 and 120 in conjunction with the hydraulic pressure formed in the first and second cylinder parts 211 and 221.

The first and second piston parts 310 and 320 press the first and second pad parts 110 and 120 toward the disc unit 10, and the first and second pad parts 110 and 120 come into contact with the disc unit 10 and generate the braking force.

Thereafter, when the driver releases the brake pedal, the braking liquid is discharged from the first and second cylinder parts 211 and 221, and a negative pressure is formed in the first and second cylinder parts 211 and 221.

The first and second piston parts 310 and 320 release the braking force while being moved rearward by the negative pressure in the direction away from the first and second pad parts 110 and 120.

Figure 12:
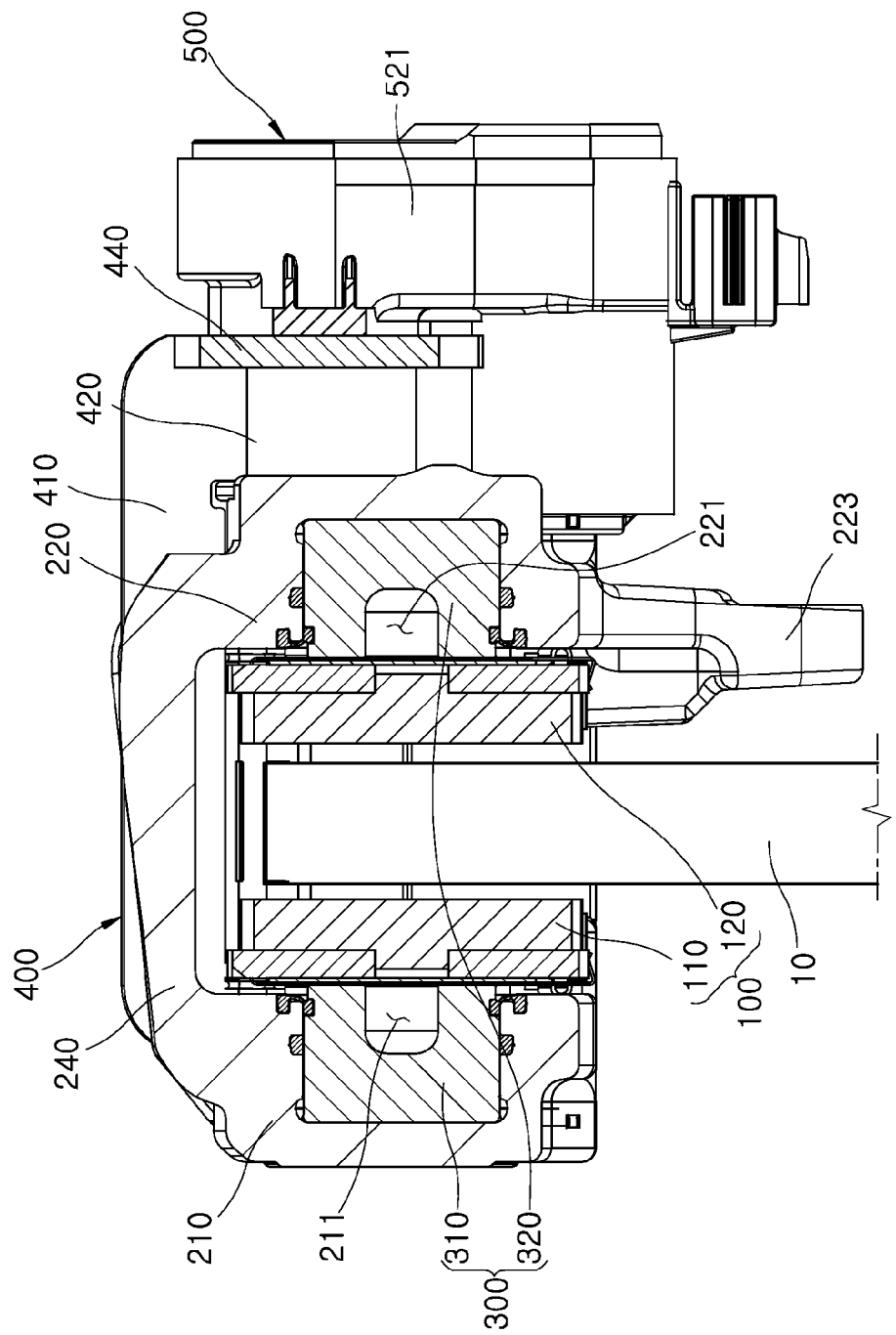
FIGS. 12 and 13 are operational views schematically illustrating a process in which the brake apparatus for a vehicle according to the embodiment of the present disclosure applies a parking braking force.
Figure 13:
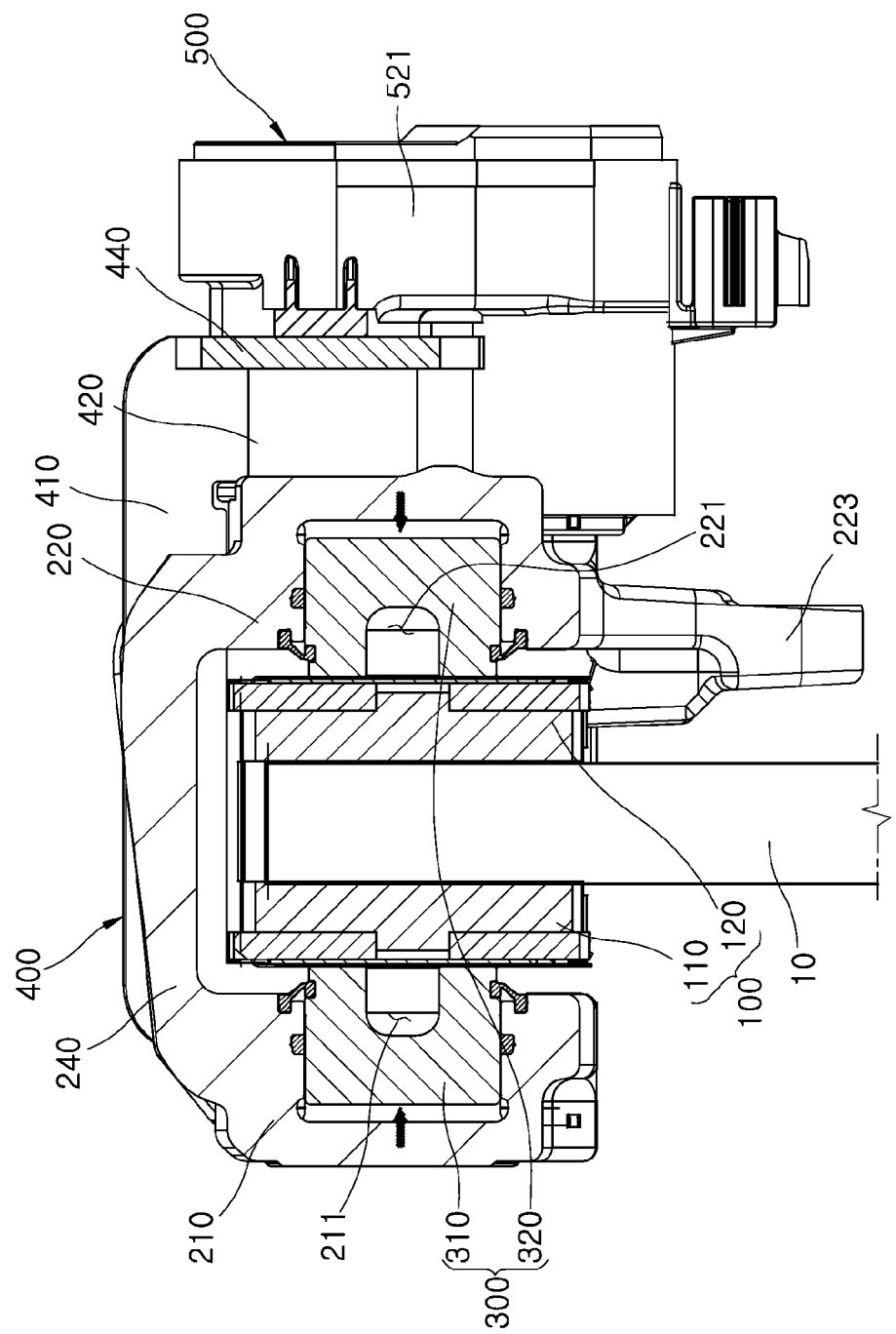

FIGS. 12 and 13 are operational views schematically illustrating a process in which the brake apparatus for a vehicle according to the embodiment of the present disclosure applies the parking braking force.

Referring to FIGS. 12 and 13, when a driver manipulates a parking brake button to park or stop a vehicle, the power generating part 521 receives a control signal from an ECU or the like and generates the rotational force.

The power transmission part 522 is rotated about the central axis thereof by the rotational force generated by the power generating part 521.

The third piston part 510 thread-coupled to the power transmission part 522 moves forward toward the second pad part 120 in conjunction with the rotational motion of the power transmission part 522.

The third piston part 510 presses the second pad part 120 toward the disc unit 10 while moving forward and brings the second pad part 120 into contact with the disc unit 10.

The reaction force is applied to the third piston part 510 in the direction opposite to the pressing force applied to the second pad part 120 by the third piston part 510.

The reaction force is transmitted to the guide part 420 sequentially through the third piston part 510, the power transmission part 522, and the bearing part 523.

The guide part 420 slides rearward in the longitudinal direction of the sleeve part 250 from the initial position of the guide part 420.

The restoration unit 600 accumulates the elastic restoring force while being elastically deformed by the sliding of the guide part 420.

At the same time, the restoration unit 600 cancels out the vibration, which is generated when the guide part 420 slides, while being elastically deformed in the direction opposite to the vibration.

The finger part 430 slides rearward together with the guide part 420 and comes into contact with the first pad part 110.

The first pad part 110 is brought into contact with the disc unit 10 by the pressing force applied by the finger part 430 and generates the braking force together with the second pad part 120.

Thereafter, when the driver manipulates the parking brake button to release the parked or stopped state of the vehicle, the drive part 520 operates in the reverse order to the above-mentioned operation and moves the third piston part 510 rearward.

When the third piston part 510 moves rearward and separates from the second pad part 120, the pressing force and the reaction force applied to the second pad part 120 are eliminated.

The guide part 420 returns to the initial position thereof while sliding forward in the longitudinal direction of the sleeve part 250 by the elastic restoring force accumulated by the restoration unit 600.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus for a vehicle, comprising:
a pad unit disposed to face a disc unit;
a first caliper body unit fixed to a vehicle body and configured to support the pad unit so that the pad unit is movable;
a first pressing unit installed on the first caliper body unit so as to be movable forward or rearward and configured to press the pad unit to apply a main braking force;
a second caliper body unit slidably installed on the first caliper body unit; and
a second pressing unit installed on the first caliper body unit so as to be movable forward or rearward and configured to press the pad unit to apply a parking braking force together with the second caliper body unit,
wherein the first caliper body unit comprises:
a first housing and a second housing symmetrically disposed with respect to the disc unit;
a seating part disposed between the first housing and the second housing and configured to allow the second caliper body unit to be seated thereon; and
a sleeve part extending from the second housing and configured to support the second caliper body unit so that the second caliper body unit is slidable,
wherein the first pressing unit comprises:
a first piston part movably inserted into a first cylinder part concavely recessed into the first housing; and
a second piston part movably inserted into a second cylinder part concavely recessed into the second housing,
wherein the second pressing unit comprises:
a third piston part movably inserted into a third cylinder part concavely recessed into the second housing; and
a drive part connected to the third piston part and configured to generate driving power to move the third piston part forward or rearward,
wherein a distance at which a central axis of the third piston part is spaced apart from a central axis of the disc unit is longer than a distance at which central axes of the first and second piston parts are spaced apart from the central axis of the disc unit.

2. The brake apparatus of claim 1, wherein the sleeve part extends from the second housing in a direction parallel to an axial direction of the disc unit.

3. The brake apparatus of claim 1, wherein the second caliper body unit comprises:
a bridge part extending in an axial direction of the disc unit;
a guide part extending from one side of the bridge part and slidably inserted into the sleeve part; and
a finger part extending from another side of the bridge part and disposed to face the pad unit.

4. The brake apparatus of claim 3, wherein a central axis of the guide part is disposed coaxially with a central axis of the second pressing unit and a central axis of the sleeve part.

5. The brake apparatus of claim 3, wherein the guide part is slid by a pressing force applied to the pad unit by the second pressing unit, and is configured to bring the finger part into contact with the pad unit.

6. The brake apparatus of claim 5, further comprising:
a restoration unit disposed between the sleeve part and the guide part and configured to move the guide part to an initial position thereof when the second pressing unit releases the pad unit.

7. The brake apparatus of claim 6, wherein the restoration unit is elastically deformable and disposed to be in contact with an outer peripheral surface of the sleeve part and an inner peripheral surface of the guide part.

8. The brake apparatus of claim 6, wherein a center of gravity of the second caliper body unit and a center of gravity of the second pressing unit are disposed at positions facing an inner peripheral surface of the restoration unit.

9. The brake apparatus of claim 1, wherein the first piston part and the second piston part respectively move forward or rearward in conjunction with hydraulic pressures transmitted to an inside of the first cylinder part and an inside of the second cylinder part, respectively.

10. The brake apparatus of claim 1, wherein the drive part comprises:
a power generating part fixed to the second caliper body unit and configured to generate a rotational force by external electric power; and
a power transmission part connected to the power generating part and the third piston part and configured to convert a rotational motion of the power generating part into a rectilinear motion of the third piston part.

11. The brake apparatus of claim 10, wherein the power transmission part has a screw thread formed on an outer peripheral surface thereof and is thread-coupled to an inner peripheral surface of the third piston part.

* * * * *